United States Patent Office 2,769,751
Patented Nov. 6, 1956

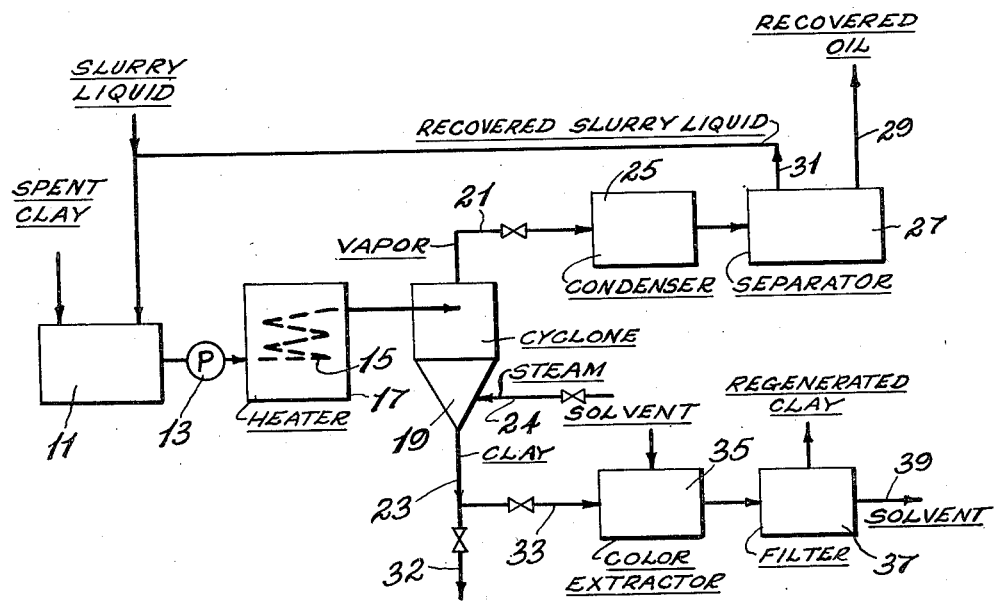

2,769,751

PROCESS FOR TREATING SPENT OIL REFINERY CLAY

Peter L. Paull, Norwalk, Conn., assignor to Texaco Development Corporation, New York, N. Y., a corporation of Delaware Application April 30, 1953, Serial No. 352,240

9 Claims. (Cl. 196—14)

The present invention relates to a novel process for treating spent clay that has been used for refining oils. More particularly it concerns a process for economically recovering absorbed oily products from clay, and simultaneously recovering the clay for reuse as a refining substance or for other purposes.

Clay has been used for many years for adsorbing coloring impurities (chromophores) from fatty oils and from such liquid petroleum products as kerosene and lubricating oils, for example 150 neutral oil, bright stock, and heavy raffinates. In the percolation process, granules of clay having a particle size between about 20 and 90 mesh U. S. standard are generally employed. The contact filtration process uses much finer clays, usually having a particle size finer than 100 mesh U. S. standard. Among the adsorptive substances used for refining oils, herein generically termed "clay," are raw or activated bentonite, fuller's earth, bauxite, synthetic magnesium silicates, activated alumina, activated carbon, and silica gel.

It has been customary in oil refineries to discard used clay by dumping it in areas adjacent to the refinery. The discarded clay may contain as much as 50% of oil by weight, and around 10% of tarry coloring matter. Much effort has been devoted to developing procedures for regenerating used clay and for recovering the adsorbed oil therefrom, since discarding the clay not only represents an enormous economic waste, but also creates a serious nuisance due to spontaneous combustion of contained oil and pollution of neighboring land and streams.

In one regenerating procedure the used clay is actually burned in a furnace to free it from oil and adsorbed coloring impurities, the oil thus going to waste.

Solvent extraction methods have also been tried but are so expensive, due to the high cost of recovering the oil and solvent from solution, that their use often cannot be justified economically. Another disadvantage of solvent extraction methods, particularly as applied to contact clays, is that they are generally carried out directly in oil filter units wherein the clay exists as fairly compact cakes which are washed in place. Consequently, complete oil extraction cannot be effected, and new adsorptive surfaces on the clay particles cannot be assured.

In accordance with the present invention there is provided a novel process for recovering oil from spent refinery clay and at the same time regenerating the clay, which overcomes the serious disadvantages of the prior art discussed above. There is first formed a flowable mixture in the form of a pumpable slurry of spent clay in a vaporizable slurry liquid. This slurry is then passed continuously through a vaporizing zone, such as a long tube, within which it is heated to a temperature high enough to vaporize the slurry liquid and any residual oil from the clay, thereby forming a flowing dispersion of clay particles in vapor. The dispersion passes as a flowing stream through the latter part of the long tube, after which the vapor is separated from the clay particles in any desired way.

After vapor separation, the vapor may be treated to recover the oil and slurry liquid, the oil being reclaimed as a low grade of oil and the slurry liquid being returned to the slurry for reuse. The separated clay is free from oil and substantially dry, and can be used for many purposes without further treatment, e. g. finely divided clay can be used in Portland cement, or as a filler for rubber, or it can be used for low grade color refining of oil. Where the spent clay is to be regenerated for reuse in high grade oil refining the residual adsorbed coloring impurities should be extracted with a suitable solvent such as alcohols, ketones, ethers, or the like. Such extraction may be done in a separate step following the separation of vapors from the clay, or it may be done as an integral part of the slurry-forming and vaporizing steps.

In the process described above a large recovery of low grade oil is obtained, in contrast to the complete loss of oil in the burning process of the prior art. Furthermore, when using a slurry liquid that is immiscible with oil the separation of oil therefrom can be economically effected by settling and decantation. In addition, when extracting the coloring impurities in a separate step a relatively small quantity of solvent is required because the oil has been substantially completely removed previously. An additional advantage is that the dispersion passes through the long tube it flows at a fairly high velocity and somewhat turbulently so that the particles of clay impinge against one another and are reduced in size, thus generating new adsorptive surfaces and increasing the total adsorptive area to improve oil refining efficiency.

The principles of the invention will be described more in detail with reference to the single figure of the accompanying drawing, which is a schematic flow diagram of apparatus suitable for performing the novel process.

For simplicity there will first be described a procedure wherein the spend clay is slurried with a liquid having little or no solvent action on the coloring impurities. Suitable liquids are water; or oil solvents such as naphtha and kerosene.

Referring to the drawing, the spend clay is placed in a slurry tank 11 wherein it is thoroughly mixed with and uniformly dispersed in a sufficient quantity of slurry liquid. The mixing can be accomplished in any suitable way, as by agitating the slurry with a motor-driven impeller. An easily pumpable slurry is one containing liquid in an amount greater than about 35% by weight, 50% being a desirable amount.

Slurry from tank 11 is then passed continuously by a pump 13 into a long confined vaporizing zone formed in tube 15 located within a furnace 17, which may be heated as by a gas or oil flame. Tube 15 should have a substantial length compared to its inside diameter, one example being a tube having a length of about 200 to 600 feet and an inside diameter of about ½ inch. Tube 15 can have any shape convenient to the operation, such as a coil of a series of parallel straight sections connected together by return bends, or even a long straight tube may be used.

In the initial part of tube 15 the slurry is heated to a temperature sufficient to vaporize the relatively low boiling slurry liquid and to strip adsorbed relatively high boiling oil from the clay, forming a dispersion of clay particles in the resulting vapor which flows through the latter part of the tube. Residual oil is removed effectively from the clay and vaporized by a stripping mechanism resulting from partial pressure effects, even though the temperature may be below the boiling point of the oil.

In general, fairly low temperatures should be maintained above the boiling point of the slurry liquid mixture since some clays are harmed by high temperatures and cannot be properly regenerated if heated too hot under low pressure, possibly due to lost water of crystallization. Temperatures above 300° F. and below about 600° F. are generally satisfactory at atmospheric pressure, although if any given clay is adversely affected at one temperature, subsequent operations should be conducted at lower temperatures. Under pressures of 50 to 3000 pounds per square inch, temperatures of 1,200° F. can be used without damaging the clay because pressure promotes retention of water of crystallization. The permissible temperature increases progressively with increasing pressure. In a specific example, water alone is used as a slurry liquid, the temperature is 600° F. maximum, and the pressure at the outlet of tube 15 is 300 pounds per square inch.

When recovering fatty oils from spent clay the effect of temperature on the oil must also be considered. Some decomposition of fatty oils may occur above about 450° F. even under pressure operation.

As the dispersion passes in a flowing stream through the latter part of tube 15, some disintegration of particles occurs as a result of colliding with one another. This is particularly prevalent when the dispersion flows turbulently at a linear velocity above about 100 feet per second. Controlled disintegration is advantageous to expedite stripping of the adsorbed oil from the particles, and for generating new adsorptive surfaces to improve refining efficiency, particularly when treating coarse particles having a core which has never been reached by the oil.

From tube 15 the hot dispersion of clay particles in vapor flows into a separator 19 such as a cyclone type of centrifugal separator of well-known construction, within which the vapor is separated from the clay. Vapor leaves at the top through a conduit 21 and deoiled clay falls to the bottom and is discharged through a conduit 23 in a hot dry condition.

It is sometimes advantageous to introduce superheated steam to the bottom portion of cyclone 19 through a conduit 24 to flow up through the descending clay particles in intimate contact therewith. This steam acts to strip any slight residue of oil from the clay and carry it over to the conduit 21. It also acts to minimize any tendency of the clay to lose water of crystallization when the pressure is reduced. Another advantage is that the steam adds a small quantity of moisture to the clay, such as about 4% by weight, so that when the clay is reused for oil refining without further treatment greater decoloring efficiency may be obtained than with perfectly dry clay.

To recover oil and slurry liquid from the vapor in conduit 21 it is passed through a suitable recovery system, as one comprising a condenser 25 followed by a separator 27. When the slurry liquid and the recovered oil are immiscible (e. g., water and oil), a gravity separation occurs and the two different liquids can be withdrawn through conduits 29 and 31, respectively. When the slurry liquid, or part of it, is a solvent for oil, the separator 27 can include a fractionating column for removing the solvent from the oil in a well-known way. Slurry liquid can be passed through the conduit 31 back into slurry tank 11 for reuse.

The deoiled clay discharged from cyclone 19 can be withdrawn through conduit 32 and used without further treatment for refining low grade highly colored oils to a moderate degree, or for other purposes such as a filler material for rubber or as a component of Portland cement. However, clay to be reused for highly refining oils is refigenerated by passing it through a conduit 33 into a color extractor 35 within which the coloring impurities are removed by slurrying the clay with a suitable solvent, preferably at a temperature of 160–180° F. Then the slurry is filtered at 37 to recover regenerated clay, which may be dried thereafter to remove retained color solvent. The used solvent passes off through a conduit 39, and can be regenerated in a well-known manner, as by distillation, to separate it from the dissolved color impurities.

Many solvent materials can be used for removing coloring impurities in the extractor 35, some of them being: methyl, ethyl, amyl, and isopropyl alcohols, methylethyl ketone, acetone, liquid sulphur dioxide, carbon tetrachloride, pyridine, carbon disulfide, monomethyl ether, glycolmonomethyl ether, and mixtures of these materials with one another or with wetting liquids such as naphtha, kerosene, and benzol. Mixtures of alcohol and benzol, or acetone and benzol, or alcohol and naphtha are highly active solvents. About 10 to 60% by volume of the solvent should be used with the wetting liquid. The solvent can be used successfully in a quantity of about ½ to 2 gallons per pound of clay, advantageously being about 1 gallon per pound.

In a modified form of the invention, the spent clay is slurried in the tank 11 with a slurry liquid consisting of or containing a solvent for the coloring impurities. Among suitable color solvents are polar solvents such as acetone and methyl ethyl ketone, and others mentioned above, either alone or mixed with such liquids as oil solvents and water. During passage of the slurry through tube 15 both the oil and coloring impurities are separated from the clay as vapors which pass oil from cyclone 19 through conduit 21. The clay is thus in a completely regenerated condition as it is discharged from the bottom of the cyclone through conduit 23, and subsequent solvent treatment is unnecessary.

The oil recovered i condenser 25 and separator 27 may be of low grade because of dissolved coloring impurities. It can be either discarded, or used for purposes wherein the impurities are not detrimental, e. g., burned as a fuel oil to heat the tube 15.

Obviously, many modifications and variations of the invention, as hereinbefore set forth, may be made without departing from the spirit and scope thereof, and therefore only such limitations should be imposed as are indicated in the appended claims.

I claim:

1. A process for treating spent petroleum clay containing color impurities and residual oil, comprising forming a flowable mixture of such spent clay in at least one vaporizable liquid selected from the group consisting of water, solvents for said residual oil, and solvents for said color impurities; passing said mixture into an initial part of a tubular heating zone; heating said mixture in said tubular zone to a temperature sufficient to vaporize both said vaporizable liquid and residual oil, thereby forming a flowing dispersion of clay particles in vapor; passing said dispersion as a flowing stream through a succeeding zone; and then separating said vapor from said clay particles.

2. A process in accordance with claim 1, also comprising recovering oil from said vapor.

3. A process in accordance with claim 1, also comprising recovering said vaporizable liquid from said vapor, and recycling said recovered liquid to form said flowable mixture.

4. A process in accordance with claim 1, also comprising introducing steam into intimate contact with said clay particles after separation of vapor therefrom.

5. A process in accordance with claim 1 wherein said particles of clay are reduced in size by subjecting said dispersion to highly turbulent flow and a velocity greater than 100 feet per second during flow through said succeeding zone.

6. A process for treating spent petroleum clay containing color impurities and residual oil, comprising forming a flowable mixture of such spent clay in water; passing said mixture into an initial part of a tubular heating zone; heating said mixture in said tubular zone to a temperature sufficient to vaporize both said water and residual oil, thereby forming a flowing dispersion of clay particles in steam; passing said dispersion as a flowing stream through a succeeding zone; and then separating said steam from said clay particles.

7. A process for treating spent petroleum clay containing color impurities and residual oil, comprising forming a flowable mixture of such spent clay in a vaporizable mixture of water and a solvent for said residual oil; passing said mixture into an initial part of a tubular heating zone; heating said mixture in said tubular zone to a temperature sufficient to vaporize both said vaporizable mixture and residual oil, thereby forming a flowing dispersion of clay particles in vapor; passing said dispersion as a flowing stream through a succeeding zone; and then separating said vapor from said clay particles.

8. A process for treating spent petroleum clay containing color impurities and residual oil, comprising forming a flowable mixture of such spent clay in a vaporizable solvent for said color impurities; passing said mixture into an initial part of a tubular heating zone; heating said mixture in said tubular zone to a temperature sufficient to vaporize both said solvent and residual oil, thereby forming a flowing dispersion of clay particles in vapor; passing said dispersion as a flowing stream through a succeeding zone; and then separating said vapor from said clay particles.

9. A process for treating spent petroleum clay containing color impurities and residual oil, comprising forming a flowable mixture of such spent clay in a vaporizable solvent for said residual oil; passing said mixture into an initial part of a tubular heating zone; heating said mixture in said tubular zone to a temperature sufficient to vaporize both said solvent and residual oil, thereby forming a flowing dispersion of clay particles in vapor; passing said dispersion as a flowing stream through a succeeding zone; and then separating said vapor from said clay particles.

References Cited in the file of this patent

UNITED STATES PATENTS

| | | |
|---|---|---|
| 1,891,107 | Osterstrom | Dec. 13, 1932 |
| 1,957,449 | Evans et al. | May 8, 1934 |
| 2,014,915 | Teichmann | Sept. 17, 1935 |
| 2,236,679 | Ferguson et al. | Apr. 1, 1941 |
| 2,382,755 | Tyson | Aug. 14, 1945 |
| 2,436,938 | Scharmann et al. | Mar. 2, 1948 |
| 2,602,044 | Lupfer et al. | July 1, 1952 |